(12) United States Patent
Shi et al.

(10) Patent No.: US 11,214,716 B2
(45) Date of Patent: Jan. 4, 2022

(54) PHENOL-BASED RESIN ADHESIVE FROM LIGNIN PYROLYSIS AND ITS PREPARATION METHOD

(71) Applicant: JIANGNAN UNIVERSITY, Wuxi (CN)

(72) Inventors: Gang Shi, Wuxi (CN); Ying Li, Wuxi (CN); Hongyan Miao, Wuxi (CN); Caihua Ni, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/195,380

(22) Filed: Mar. 8, 2021

(65) Prior Publication Data
US 2021/0189200 A1 Jun. 24, 2021

(30) Foreign Application Priority Data

Mar. 10, 2020 (CN) .......................... 202010162680.2

(51) Int. Cl.
*C09J 161/14* (2006.01)
*C09J 161/06* (2006.01)
*C08G 8/24* (2006.01)
*C08G 8/28* (2006.01)

(52) U.S. Cl.
CPC .................. *C09J 161/14* (2013.01)

(58) Field of Classification Search
None
See application file for complete search history.

(56) References Cited

FOREIGN PATENT DOCUMENTS

| CN | 102070408 A | | 5/2011 |
|---|---|---|---|
| CN | 104245799 A | | 12/2014 |
| CN | 105111394 A | | 12/2015 |
| CN | 105694781 A | * | 6/2016 |
| CN | 106854264 A | | 6/2017 |
| CN | 109851733 A | | 6/2019 |
| CN | 110437508 A | | 11/2019 |
| CN | 111040688 A | * | 4/2020 |
| EP | 2993201 A1 | | 3/2016 |

* cited by examiner

*Primary Examiner* — Ha S Nguyen
(74) *Attorney, Agent, or Firm* — CBM Patent Consulting, LLC

(57) ABSTRACT

The present invention relates to a phenol-based resin adhesive from lignin pyrolysis, comprising a polymer of phenol and formaldehyde from lignin pyrolysis, wherein the phenol from lignin pyrolysis comprises at least two phenols from lignin pyrolysis or at least two lignin-modified phenols from lignin pyrolysis. A repeat unit of the polymer of phenol and formaldehyde from lignin pyrolysis comprises at least two phenol units from lignin pyrolysis or at least two lignin-modified phenol units from lignin pyrolysis. According to the phenol-based resin adhesive from lignin pyrolysis in the present invention, by-products during the pyrolysis of lignin for power generation are used as raw materials, so it is environment-friendly and economical.

5 Claims, 4 Drawing Sheets

PHENOL-BASED RESIN ADHESIVE FROM LIGNIN PYROLYSIS AND ITS PREPARATION METHOD

This application claims priority to Chinese Patent Application Ser. No. 202010162680.2 filed on 10 Mar. 2020.

TECHNICAL FIELD OF THE INVENTION

The present invention relates to the field of adhesives, in particular to a phenol-based resin adhesive from lignin pyrolysis and its preparation method.

BACKGROUND OF THE INVENTION

Rice and wheat are two major food crops in China. With a good harvest of rice, wheat and barley, a large amount of agricultural wastes are also produced, such as husk and straw. Husk and straw are mainly composed of semi-cellulose, cellulose and lignin. Among them, semi-cellulose and cellulose have clear molecular structure, so their extraction and application are well known. However, the product of lignin is not well developed, and its application is suffocated, because lignin has complex molecular structure and low activity. In recent years, research institutions in China and overseas have accelerated the research and development of lignin. At present, according to the potential applications of lignin, its research and development are mainly focused on three aspects: lignin-based polymer, lignin-based chelating agent with surface activity and lignin biofuel.

Because lignin has complex molecular structure, and trends to agglomerate, the market share of lignin-based polymers and lignin-based chelating agent with surface activity is relatively small. At present, in the field of actual production and use of lignin, most of lignin is used in pyrolysis for power generation, and its by-product (phenol from pyrolysis) is directly discharged, causing environmental pollution, which has not drawn any attention from the industry and related departments. Thus, it is an urgent problem to be solved.

CN109096965A discloses a structural adhesive based on biomass pyrolysis oil and a preparation method of novel laminated wood. A macromolecular structural adhesive based on biomass pyrolysis oil is used, and the pyrolysis oil is used as a preservative to treat a surface board of the novel laminated wood. CN108102591A discloses a method for preparing a room temperature curing structural adhesive based on biomass pyrolysis oil, in which green renewable and cheap biomass pyrolysis oil is used as a raw material, step-by-step synthesis reaction with resorcinol, phenol, formaldehyde, epichlorohydrin and the like is carried out, wherein the biomass pyrolysis oil is prepared by dissolving pyrolysis lignin in methanol. In the above-mentioned two methods, the phenol from lignin pyrolysis have not been sufficiently used.

SUMMARY OF THE INVENTION

To solve the above technical problem, the purpose of the present invention is to provide a phenol-based resin adhesive from lignin pyrolysis and a method for preparing the same. To prepare the phenol-based resin adhesive from lignin pyrolysis of the present invention, by-products in the pyrolysis of lignin for power generation are used as raw materials. Thus, it is environment-friendly and economical.

The first objective of the present invention is to provide a phenol-based resin adhesive from lignin pyrolysis, comprising a polymer of phenol and formaldehyde from lignin pyrolysis, wherein a repeat unit of the polymer of phenol and formaldehyde from lignin pyrolysis comprises at least two phenol units from lignin pyrolysis or at least two lignin-modified phenol units from lignin pyrolysis.

Further, the phenol from lignin pyrolysis is the by-products in the pyrolysis of lignin for power generation, namely monophenols and small molecular polyphenols, comprising at least two selected from p-hydroxyphenyl phenol, guaiacyl phenol, syringyl phenol, phenol, cresol, pyrocatechol and pyrogallol.

Further, the phenol from lignin pyrolysis is derived from a phenol solution from lignin pyrolysis, and a method for preparing the phenol solution from lignin pyrolysis comprises the step of:

dissolving pyrolysis gas generated during the pyrolysis of lignin at 300° C.-800° C. for power generation into water to obtain the phenol solution from lignin pyrolysis.

Further, spraying the pyrolysis gas with water, so as to obtain an aqueous solution of the phenol from lignin pyrolysis after cooling.

Further, lignin-modified phenols from lignin pyrolysis is derived from a lignin solution modified by the phenol from lignin pyrolysis, and a method for preparing the lignin solution modified by the phenol from lignin pyrolysis comprises the step of:

subjecting the phenol solution from lignin pyrolysis and lignin to activated modification under pH 10-13 at 90° C., so as to obtain the lignin solution modified by the phenol from lignin pyrolysis after the reaction completes.

Further, the mass of the phenol from lignin pyrolysis or the lignin-modified phenol from lignin pyrolysis accounts for 30%-60% of the total mass of phenol and formaldehyde from lignin pyrolysis.

Further, the second objective of the present invention is to provide a method for preparing the above phenol-based resin adhesive from lignin pyrolysis, comprising the step of:

(1) pre-polymerizing a phenol solution from lignin pyrolysis or a lignin solution modified by the phenol from lignin pyrolysis with first formaldehyde solution under pH 12-14, so as to obtain a prepolymer after the reaction completes;

(2) reacting the prepolymer with a second formaldehyde solution under the action of a formaldehyde scavenger, and vacuum distillating after the reaction completes so that the reaction solution has a viscosity no less than 60 mPa·s, consequently, the phenol-based resin adhesive from lignin pyrolysis is obtained; wherein the mass ratio of formaldehyde in the first formaldehyde solution to that in the second formaldehyde solution is 4:1.

Further, in step (1), the method for preparing the phenol solution from lignin pyrolysis comprises the step of:

dissolving pyrolysis gas generated during the pyrolysis of lignin at 300° C.-800° C. for power generation into water to obtain the phenol solution from lignin pyrolysis.

Further, in step (1), the method for preparing the lignin solution modified by the phenol from lignin pyrolysis comprises the step of:

dissolving pyrolysis gas generated during the pyrolysis of lignin at 300° C.-800° C. for power generation into water to obtain a phenol solution from lignin pyrolysis; then subjecting the phenol solution from lignin pyrolysis and lignin to activated modification under pH 10-13 at 90° C., so as to obtain the lignin solution modified by the phenol from lignin pyrolysis after the reaction completes. The reaction time of the activated modification is 1-3 h.

Further, in step (1), the reaction time of the pre-polymerization is 0.5-1 h.

Further, in steps (1) and (2), the reaction temperature is 75-90° C.

Further, in step (1), adjusting pH with pH regulator, preferably, the pH regulator is NaOH.

Further, the mass ratio of total formaldehyde in the first formaldehyde solution and the second formaldehyde solution to phenolic compounds in the lignin solution modified by the phenol from lignin pyrolysis is 1-1.5:1.

Further, in step (2), the formaldehyde scavenger is urea.

Besides lignin, there are cellulose and semicellulose in straw and husk, so there are a lot of other impurities, in addition of phenols, in the pyrolysis liquid after direct pyrolysis. While phenols from lignin pyrolysis are used as raw materials, in which phenol has high purity and high content, so it is suitable for direct preparation of phenolic resin (a polymer of phenol and formaldehyde from lignin pyrolysis) from solution.

Based on the above technical scheme, the present invention has at least the following advantages:

According to the phenol-based resin adhesive from lignin pyrolysis in the present invention, by-products during the pyrolysis of lignin for power generation, namely phenols from lignin pyrolysis, are used as raw materials, in which there are monophenols and small molecular polyphenols, so it is environment-friendly and economical, and increases adhesiveness of the adhesive.

The above is only a brief description of the technical scheme of the present invention. In order to make the technical means of the present invention more clear, and make it able to be implemented according to the content of the description, the following is described with relatively good embodiments of the present invention in combination with detailed description of drawings.

BRIEF DESCRIPTION OF DRAWINGS

In FIGS. 1-3, GB refers to national standards of China.

DETAIL DESCRIPTION OF THE INVENTION

The present invention will be further explained in combination with embodiments. The following embodiment is used for illustrating the invention but limiting the scope thereof.

Example 1

Lignin was firstly pyrolyzed at 600° C., and the pyrolysis gas generated during this process was cooled by cold water spray. After collection and cooling, the phenol solution from lignin pyrolysis was obtained.

Then, the phenol content in the phenol solution from lignin pyrolysis was measured as follows: 20 mL of distilled water was added into a reparatory funnel with 250 mL, then a proper amount of well-mixed phenol solution from lignin pyrolysis was added, and then the pH was adjusted to 10-11 (measured by extensive pH indicator paper) with a sodium hydroxide solution of 5 mol/L, and the amount of sodium hydroxide solution was recorded. Distilled water was added till the total volume of the solution reaches 10 mL 5.0 mL of carbon disulfide was added, and then an oscillation extraction was performed for 2 minutes. The solution was left for stratification, and then the lower organic phase was transferred into 10 mL tube with a plug. 2.0 μL of carbon disulfide was injected into the gas chromatograph for testing. The results showed that the solution of phenol from lignin pyrolysis contains 3 wt % of p-hydroxyphenyl phenol, 4 wt % of guaiacyl phenol, 1 wt % of syringyl phenol, 12 wt % of phenol and 7 wt % of pyrocatechol.

Example 2

The phenol solution from lignin pyrolysis prepared in Example 1 was reacted with a formaldehyde aqueous solution to obtain a phenol-based resin adhesive from lignin pyrolysis. The mass ratio of formaldehyde in the formaldehyde aqueous solution to phenolic compounds in the phenol solution from lignin pyrolysis were changed to 1.1:1, 1.2:1, 1.3:1, 1.4:1, 1.5:1, so as to carry out multiple groups of parallel experiments, the steps are as follows:

80% of the planned total amount of formaldehyde was directly added into the phenol solution from lignin pyrolysis, and then prepolymerization was carried out for half an hour, the pH value was 13.56, the reaction temperature was 80° C., then the remaining 20% of formaldehyde and a formaldehyde scavenger (urea) were added, so that the reaction was performed for a certain time until the reaction completed, and then was vacuum distillated till the viscosity of reaction solution was 65 mPa·s, and the product was discharged to obtain a phenol-based resin adhesive from lignin pyrolysis. The adhesive comprises a phenolic resin, and a repeat unit of the phenolic resin comprises a plurality of phenol units from lignin pyrolysis.

Figure 1:
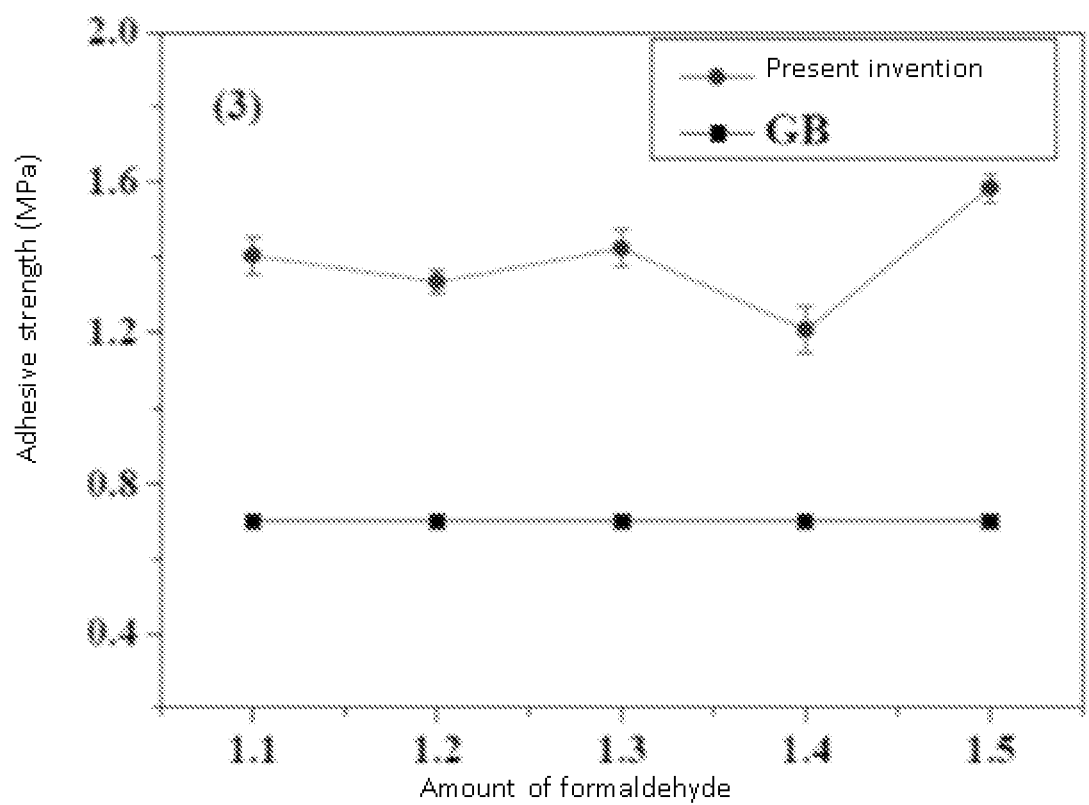
FIG. 1 shows the effect of the addition amount of formaldehyde on the adhesive strength of phenol-based resin adhesive from lignin pyrolysis.

FIG. 1 shows the effect of the addition amount of formaldehyde on the adhesive strength of phenol-based resin adhesive from lignin pyrolysis. It can be seen that the adhesive strengths of all adhesives with the above addition amount of formaldehyde in the present invention are higher than that in the national standards of China.

Example 3

The phenol solution from lignin pyrolysis prepared in Example 1 was reacted with a formaldehyde aqueous solution to obtain a phenol-based resin adhesive from lignin pyrolysis. The mass ratio of formaldehyde to phenolic compounds in the phenol solution from lignin pyrolysis was 1.3:1; then 80% of the planned total amount of formaldehyde was directly added into the solution of phenol from lignin pyrolysis; and then NaOH was added to adjust the pH value of the reaction solution, a group of experiments were performed under pH=12.51, 12.97, 13.56, 13.89, the reaction temperature of experiments in each group was 80° C., and then prepolymerization was carried out for half an hour, then the remaining 20% of formaldehyde and a formaldehyde scavenger (urea) were added into each group, so that the reaction was performed for a certain time until the reaction completed, and then was vacuum distillated till the viscosity of reaction solution was 65 mPa·s, and the product was discharged to obtain a phenol-based resin adhesive from lignin pyrolysis.

Figure 2:
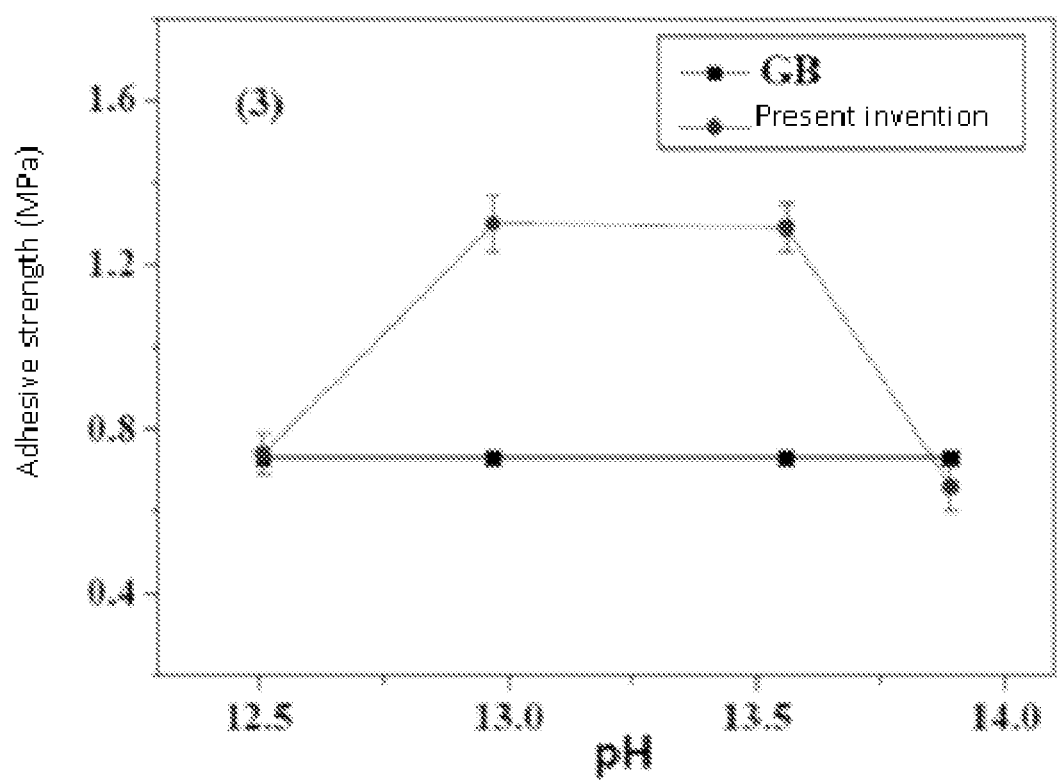
FIG. 2 shows the effect of the pH of reaction solution on the adhesive strength of phenol-based resin adhesive from lignin pyrolysis.

FIG. 2 shows the effect of the pH of reaction solution on the adhesive strength of phenol-based resin adhesive from lignin pyrolysis. It can be seen that the adhesive has the highest adhesive strength when pH is in the range of 12.97-13.56.

Example 4

The phenol solution from lignin pyrolysis prepared in Example 1 was reacted with a formaldehyde aqueous solution to obtain a phenol-based resin adhesive from lignin pyrolysis. The mass ratio of formaldehyde to phenolic compounds in the phenol solution from lignin pyrolysis was 1.3:1; then 80% of the planned total amount of formaldehyde was directly added into the solution of phenol from lignin pyrolysis; and then NaOH was added to adjust the pH value of the reaction solution to 12.97, a group of experiments were performed with the reaction temperatures of 75° C., 80° C., 85° C., 90° C., and then prepolymerization was carried out for half an hour, then the remaining 20% of formaldehyde and a formaldehyde scavenger (urea) were added into each group, so that the reaction was performed for a certain time until the reaction completed, and then was vacuum distillated till the viscosity of reaction solution was 65 mPa·s, and the product was discharged.

Figure 3:
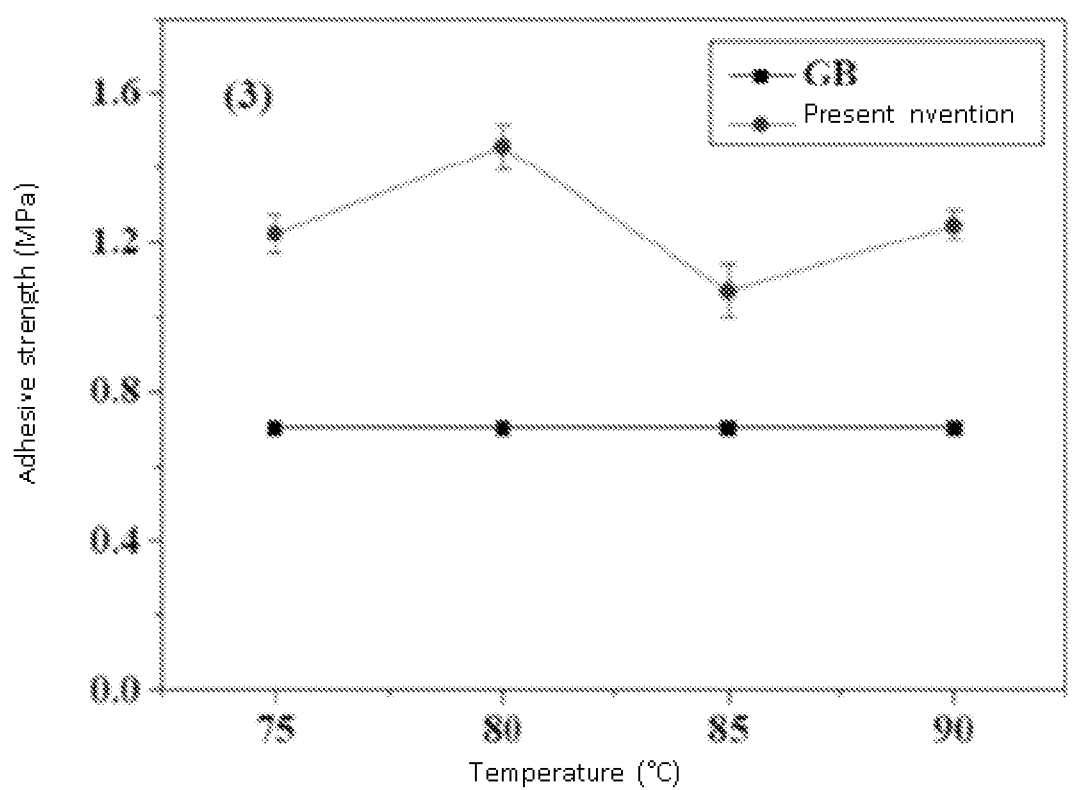
FIG. 3 shows the effect of the reaction temperature on the adhesive strength of phenol-based resin adhesive from lignin pyrolysis.

FIG. 3 summarizes the effect of the reaction temperature on the adhesive strength of phenol-based resin adhesive from lignin pyrolysis. It can be seen that the adhesive has the highest adhesive strength when the temperature is 80° C.

Example 5

Lignin was added into the phenol solution from lignin pyrolysis prepared in Example 1, the ratio of the mass of lignin in the total mass of phenols from lignin pyrolysis was adjusted (20%, 40%, 60%, 80%), and then NaOH was added into the solution to adjust the pH value to 11.2, an activated modification was performed at 90° C. for 1.5 h, so as to obtain a lignin solution modified by the phenol from lignin pyrolysis.

Figure 4:
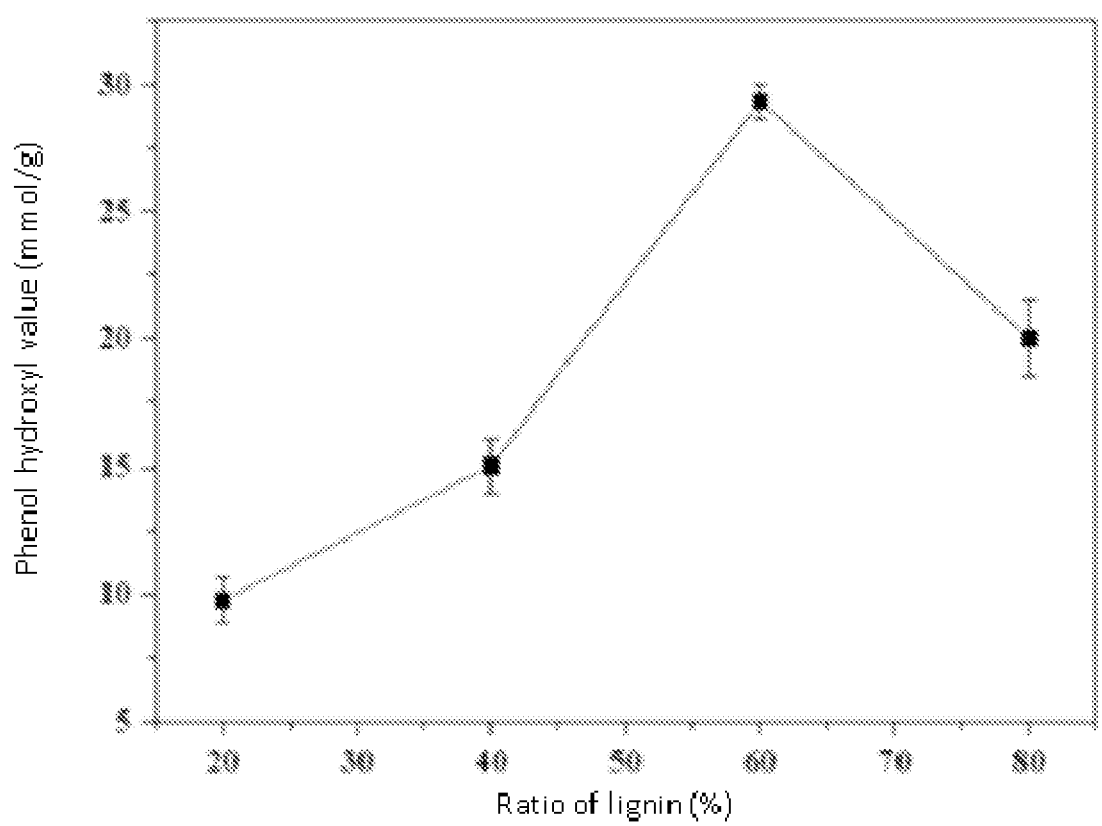
FIG. 4 shows the effect of the ratio of lignin on the phenol hydroxyl value in the lignin solution modified by the phenol from lignin pyrolysis.

FIG. 4 summarizes the effect of the ratio of lignin on the phenol hydroxyl value in the lignin solution modified by the phenol from lignin pyrolysis. It can be seen that the adhesive has the highest adhesive strength when the ratio of lignin is 60%.

Then the lignin solution modified by the phenol from lignin pyrolysis (the ratio of the total mass of lignin and phenols from lignin pyrolysis (60%)) obtained above was reacted with a formaldehyde aqueous solution. The mass ratio of formaldehyde to phenolic compounds in the phenol solution from lignin pyrolysis was 1.3:1; then 80% of the planned total amount of formaldehyde was directly added into the solution of phenol from lignin pyrolysis; and then NaOH was added to adjust the pH value of the reaction solution to 12.97, the reaction temperatures was adjusted to 80° C., and then prepolymerization was carried out for half an hour, then the remaining 20% of formaldehyde and a formaldehyde scavenger (urea) were added into each group, so that the reaction was performed for a certain time until the reaction completed, and then was vacuum distillated till the viscosity of reaction solution was 65 mPa·s, and the product was discharged to obtain a phenol-based resin adhesive from lignin pyrolysis. The adhesive comprises a phenolic resin, and a repeat unit of the phenolic resin comprises a plurality of lignin-modified phenol units from lignin pyrolysis. The adhesive has an adhesive strength of 1.85 MPa.

The above is only the preferred embodiment of the present invention and is not used to limit the present invention. It should be pointed out that many variations and modifications without departing from the technical principle of the present invention may be made by those skilled in the art, so these variations and modifications should be deemed as falling in the protection scope of the present invention.

What is claimed is:

1. A resin adhesive based on a lignin pyrolytic phenol, comprising a polymer of lignin pyrolytic phenol-modified lignin and formaldehyde, wherein a repeat unit of the polymer comprises at least two kinds of lignin pyrolytic phenol groups in the lignin pyrolytic phenol-modified lignin; the lignin pyrolytic phenol groups are two or more selected from the group consisting of p-hydroxyphenyl phenol, guaiacyl phenol, syringyl phenol, phenol, cresol, pyrocatechol and pyrogallol; the lignin pyrolytic phenol is derived from lignin pyrolysis; and the lignin pyrolytic phenol-modified lignin is prepared by reacting a lignin and the lignin pyrolytic phenol under pH 10-13 at 60-95° C.

2. A method for preparing the resin adhesive based on the lignin pyrolytic phenol of claim 1, comprising the following steps:
    (1) pre-polymerizing a lignin pyrolytic phenol-modified lignin and a first formaldehyde solution under pH 12-14, so as to obtaining a prepolymer;
    (2) reacting the prepolymer with a second formaldehyde solution under the action of a formaldehyde scavenger, vacuum distillating and obtaining the resin adhesive-based on the lignin pyrolytic phenol which a viscosity no less than 60 mPa*s;
    wherein the mass ratio of formaldehyde in the first formaldehyde solution to that in the second formaldehyde solution is 3-4:1.

3. The method according to claim 2, wherein the lignin pyrolytic phenol-modified lignin of step (1) is further obtained by a process comprising:
    dissolving pyrolysis gas, that is generated by a pyrolysis of lignin at 300° C.-800° C. for power generation, into water to obtain a phenol solution from the lignin pyrolysis; reacting the phenol solution and a lignin under pH 10-13 at 60-95° C. to obtain the lignin pyrolytic phenol-modified lignin.

4. The method according to claim 2, wherein in steps (1) and (2), the reaction temperature is 75-90° C.

5. The method according to claim 2, wherein the mass ratio of total formaldehyde in the first formaldehyde solution and the second formaldehyde solution to the lignin pyrolytic phenol groups of the lignin pyrolytic phenol-modified lignin is 1-1.5:1.

* * * * *